US011155237B2

(12) United States Patent
Leedy

(10) Patent No.: US 11,155,237 B2
(45) Date of Patent: Oct. 26, 2021

(54) PERIMETER ALERT DEFENSE SYSTEM

(71) Applicant: John Leedy, Mulberry, FL (US)

(72) Inventor: John Leedy, Mulberry, FL (US)

(*) Notice: Subject to any disclaimer, the term of this patent is extended or adjusted under 35 U.S.C. 154(b) by 0 days.

(21) Appl. No.: 16/533,378

(22) Filed: Aug. 6, 2019

(65) Prior Publication Data

US 2021/0039592 A1 Feb. 11, 2021

(51) Int. Cl.
*B60R 25/10* (2013.01)
*B60R 25/30* (2013.01)
(52) U.S. Cl.
CPC ........ *B60R 25/1012* (2013.01); *B60R 25/305* (2013.01); *B60R 2025/1016* (2013.01)
(58) Field of Classification Search
CPC .................................................. B60R 25/1012
USPC ................. 340/426.1, 426.18, 540, 541, 566
See application file for complete search history.

(56) References Cited

U.S. PATENT DOCUMENTS

| | | | | |
|---|---|---|---|---|
| 7,298,246 | B1* | 11/2007 | Schmitt | B60R 25/1004 340/426.1 |
| 7,449,992 | B2* | 11/2008 | Taki | B60R 25/1003 340/426.1 |
| 2005/0099273 | A1* | 5/2005 | Shimomura | B60R 25/305 340/426.1 |
| 2011/0316682 | A1* | 12/2011 | Pan | H04N 7/188 340/426.24 |
| 2014/0085477 | A1* | 3/2014 | Takano | G06K 9/00791 348/148 |
| 2018/0072269 | A1* | 3/2018 | Tong | B60R 25/305 |
| 2018/0139485 | A1* | 5/2018 | Ansari | H04N 21/2743 |
| 2019/0113916 | A1* | 4/2019 | Guo | B60W 60/0015 |

* cited by examiner

*Primary Examiner* — Tai T Nguyen
(74) *Attorney, Agent, or Firm* — Cygnet IP Law, P.A.; Stephen W. Aycock, II

(57) ABSTRACT

Perimeter alert defense systems and methods are described.

20 Claims, 14 Drawing Sheets

PERIMETER ALERT DEFENSE SYSTEM

TECHNICAL FIELD

Some implementations relate generally to vehicle and location security systems, and more particularly, to systems and methods for securing perimeters of vehicles or other locations.

BACKGROUND

Tragically, law enforcements officers are often killed while sitting in a patrol car. The officers presently have no system to alert them of a vehicle or person approaching a patrol car. Thus, while an officer is engaged in a task such as writing up an incident report, the officer is vulnerable to attack.

Also, people in certain situations (e.g., camping, performing nature field research, etc.) may desire to be alerted to any approaching people or animals. There may not be available presently a system to provide such an alert while monitoring a 360 degree perimeter of a location such as a campsite.

Further, people in hostile situations (e.g., military personnel, law enforcement, etc.) may desire to be alerted to an approaching person, vehicle or animal at a portable or moveable location (e.g., temporary command post, combat position, stake out or observation location, etc.)

Some implementations were conceived in light of the above-mentioned needs, problems, and limitations, among other things.

DETAILED DESCRIPTION

Figure 1:
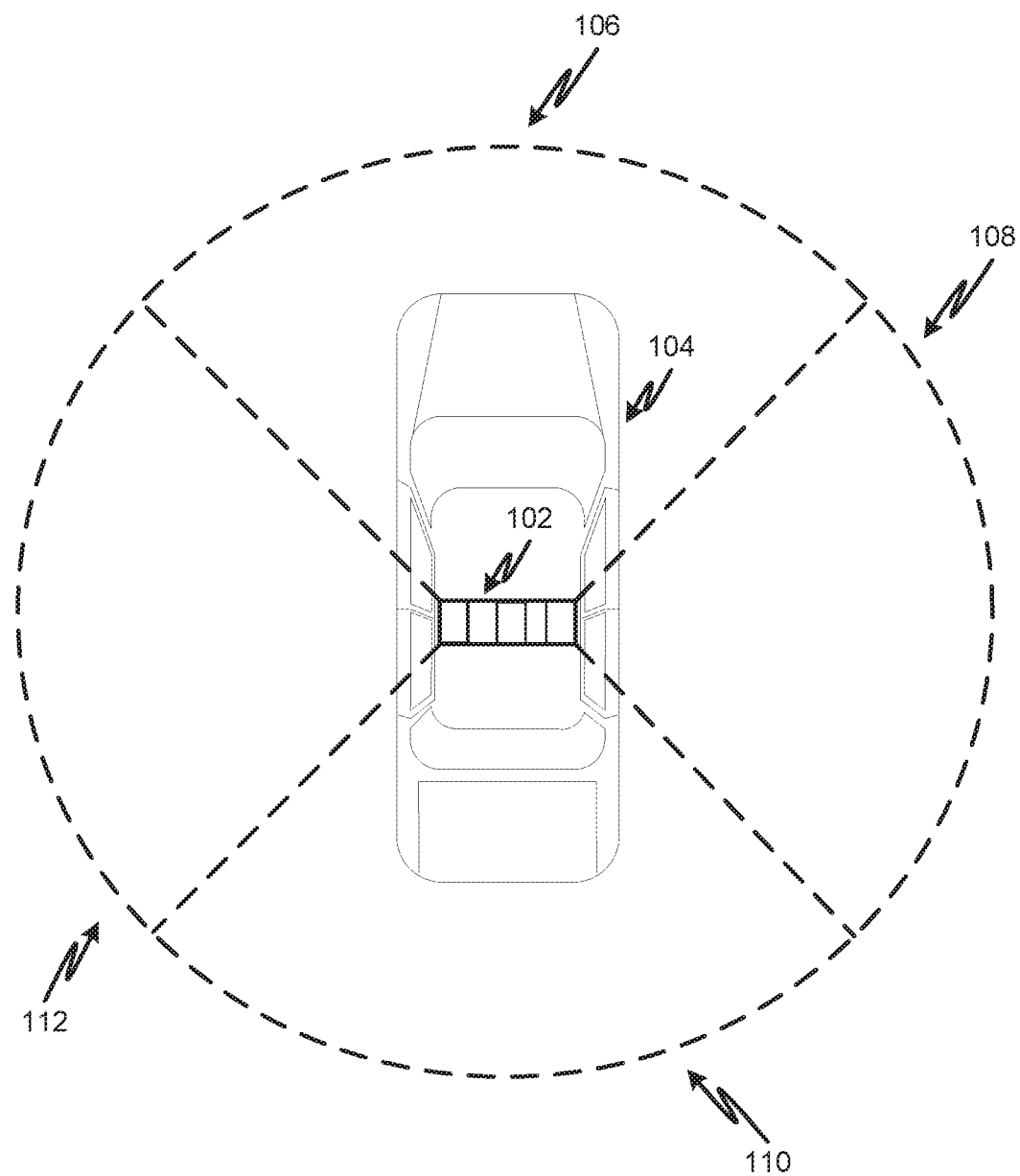
FIG. 1 is a diagram of an example perimeter alert defense system mounted on a vehicle showing example intrusion detection quadrants in accordance with some implementations.

FIG. 1 is a diagram of an example perimeter alert defense system 102 mounted on a vehicle 104 showing example intrusion detection quadrants (106-112) in accordance with some implementations. The vehicle can include a car (e.g., a law enforcement vehicle), a truck, a recreational vehicle, an all terrain vehicle, etc.

Figure 2:
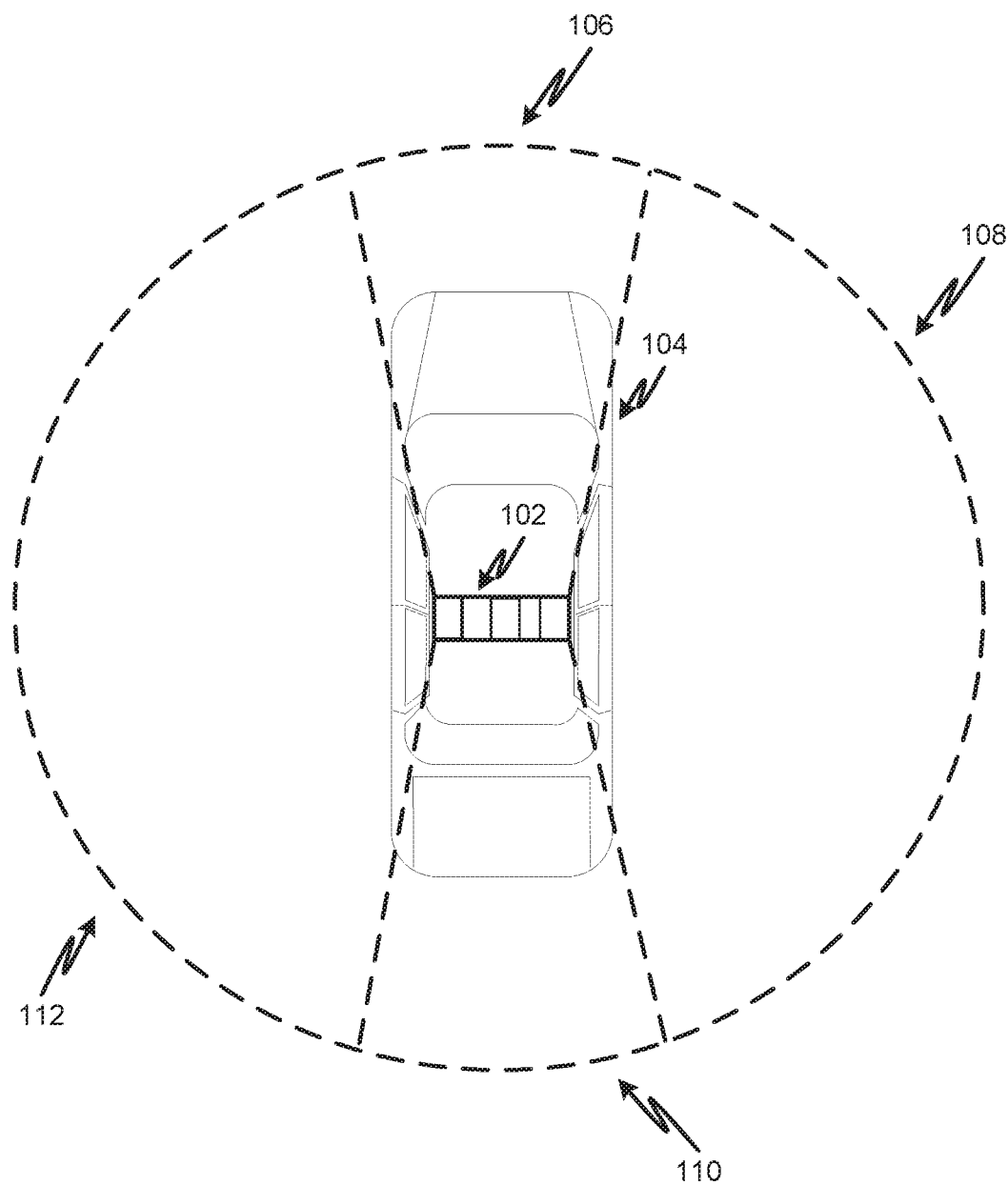
FIG. 2 is a diagram of an example perimeter alert defense system mounted on a vehicle showing example intrusion detection quadrants in accordance with some implementations.

FIG. 2 is a diagram of an example perimeter alert defense system 102 mounted on a vehicle 104 showing example intrusion detection quadrants (106-112) in accordance with some implementations.

Figure 3:
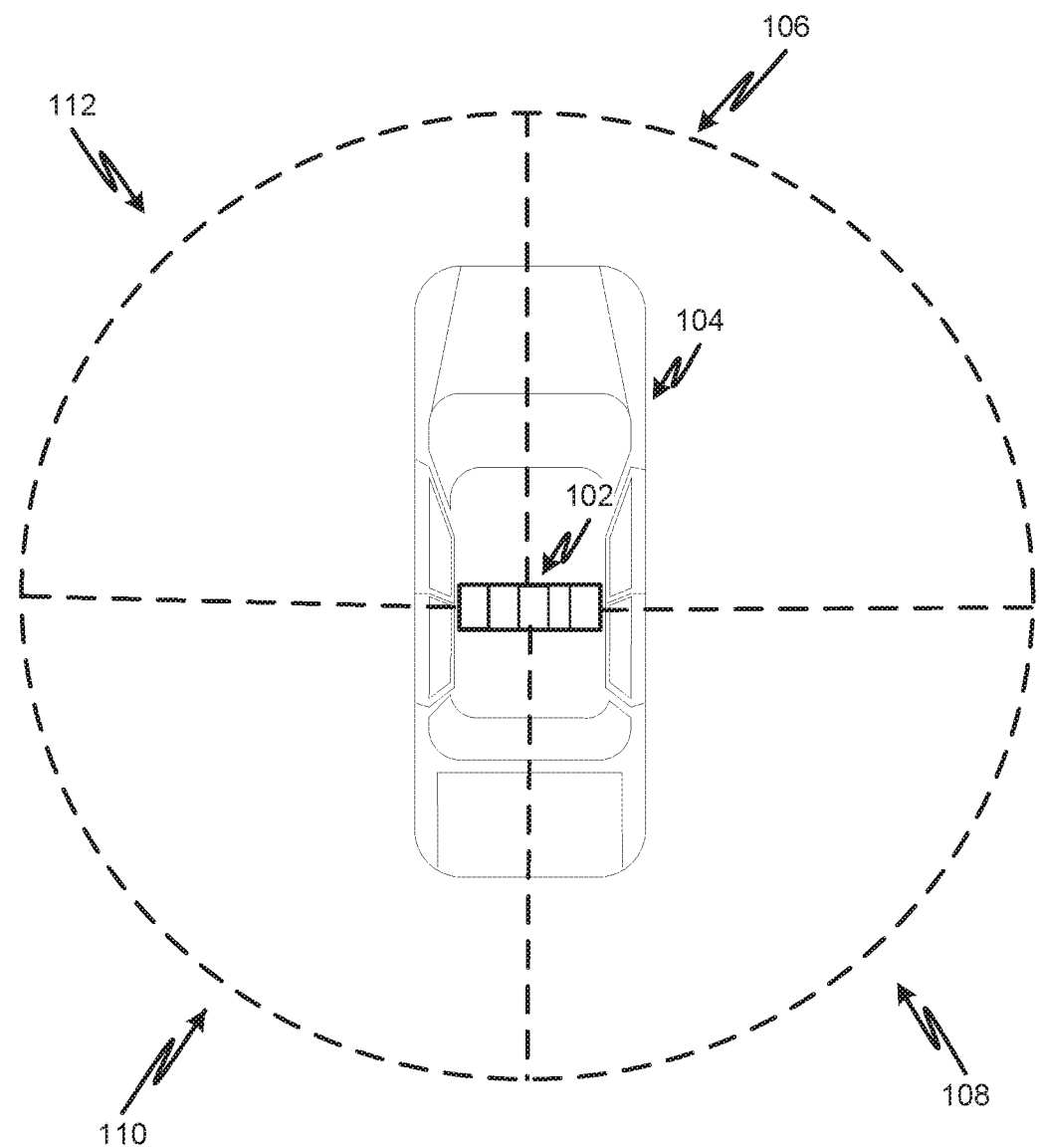
FIG. 3 is a diagram of an example perimeter alert defense system mounted on a vehicle showing example intrusion detection quadrants in accordance with some implementations.

FIG. 3 is a diagram of an example perimeter alert defense system 102 mounted on a vehicle 104 showing example intrusion detection quadrants (106-112) in accordance with some implementations.

Figure 11:
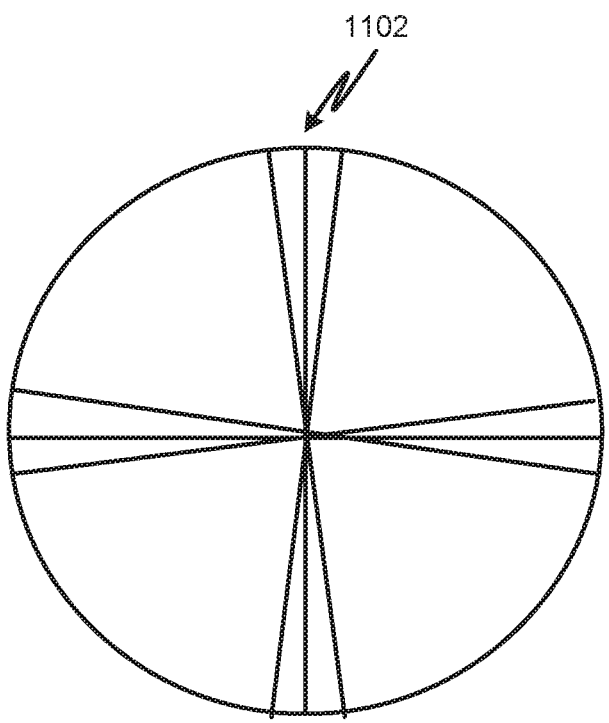
FIG. 11 is a diagram of example perimeter alert defense system quadrant overlap in accordance with some implementations.

As shown in FIGS. 1-3, an implementation of the perimeter alert defense system can include perimeter detection quadrants of various shapes, sizes and configurations. Also, two or more of the detection quadrants can overlap (1102) as shown in FIG. 11.

Figure 4:
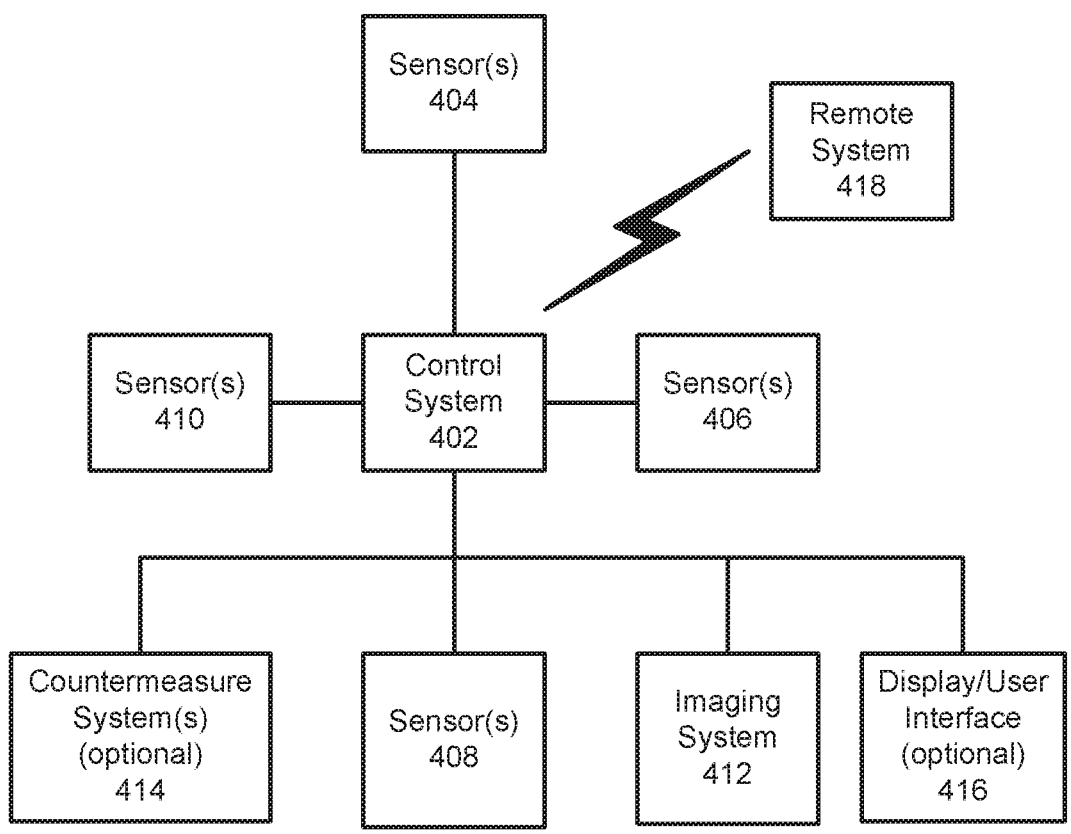
FIG. 4 is a diagram of an example perimeter alert defense system in accordance with some implementations.

FIG. 4 is a diagram of an example perimeter alert defense system 400 in accordance with some implementations. The system 400 includes a control unit 402, one or more sensors 404-410, an imaging system 412, an optional countermeasure system 414, an optional display/user interface 416, and a remote system 418.

The control unit 402 can be configured to receive signals from one or more sensors (e.g., 404-410). The sensors can include motion detectors, heat detectors, active infrared sensors, passive infrared sensors, microwave motion detection, imaging devices, radar, lidar, sonar, thermal imaging, or the like. In general any sensors suitable for detecting motion, presence, heat, etc. of a human, vehicle or animal, could be used.

The control unit 402 can also be configured to receive a video signal from an imaging system 412. The imaging system 412 can include visible video or picture imaging, infrared imaging or other imaging.

The control unit 402 can be programmed to detect an intrusion within a perimeter monitored by the sensors. An intrusion can be defined through one or more parameters such as movement of an object giving off heat within a certain distance of the perimeter alert defense unit (or other user defined point within the perimeter), moving toward a vehicle or other point at a certain rate, etc. The control unit can also be programmed to use the sensor data and/or imaging data to perform motion detection and/or target acquisition, where a target may include an object moving toward a vehicle or other position protected by the system 400. The control unit 402 may also be configured to perform facial recognition or object recognition using data from the imaging system and/or sensors data in order to attempt to recognize a person, animal, or other object within the perimeter being protected by the system 400.

The control unit 402 can cause video images and/or sound to be recorded continuously while the system is in operation. The recording can be transferred to an external storage device (e.g., cloud storage or other external storage) as needed, or may overwrite in a loop over a given time period. The video imaging and recording can be optional.

The system 400 can also include a solar power system to recharge batteries or provide power to the perimeter alert defense system.

In operation, when the control unit 402 determines that an intrusion into the perimeter has occurred, the control unit 402 can cause an alert to be provided to an operator of the system (e.g., a law enforcement officer). The alert can include a visual alert (e.g., on a display 416 or on a remote device 418 such as a mobile device running an app configured to provide a user interface for the control unit 402), an audio alert (e.g., on a display 416 or on a remote device 418 such as a mobile device) or a discreet audio alert provided via an earpiece to an operator, or via a haptic alert (e.g., vibration or other tactile signal). The visual or audio alerts can include information such as direction, distance and closing rate of intruder. Examples of user interfaces showing visual alerts are provided in FIGS. 7, 8, and 10 described below.

For the audio alerts, a speaker system can be set up in a vehicle using wired or wireless (e.g., Bluetooth) speakers in a configuration surrounding the driver or operator such that the audible alert can be provided from a speaker corresponding to the direction from which the intruder is approaching the vehicle to help the operator more quickly ascertain the nature of the intruder (e.g., threat or not). Volume and/or tone can be used in indicate approximate distance. For example, increasing volume (or changing pitch) can indicate decreasing distance to the intruder.

The control unit 402 can be programmed to ignore one or more quadrants. For example, if a given quadrant is oriented toward an area considered safe and from which movement may be detected. Deactivating one or more quadrants can be performed from a user interface, e.g., FIG. 7). Also, the distance being monitored by the control unit 402 can be adjusted by the operator. Other adjustments can also be made to modify the field of the perimeter being monitored, such as height, etc.

The control unit can be programmed to compensate for objects that may be moving, but which are not of concern. For example, the control unit can be programmed to ignore moving trees, flags or other objects that may move in a breeze. The control unit can be programmed to distinguish between people, animals, and moving objects such as vehicles. The control unit can be programmed to provide alerts for one or more types of intrusions (e.g., people, animals, moving objects).

The control unit can be programmed to receive an indication that an intruder is "friendly" and thus to stop generating an alert for that intruder. This indication can be received from a control on a user interface (e.g., on the display/user interface 416 or the remote system 418).

The system 400 can be integrated into the light bar of a law enforcement or emergency response vehicle. The system 400 can be configured as an add-on kit to modify an existing light bar of a law enforcement or emergency response vehicle.

The system 400 can also include an optional counter measure system 414. For example, in law enforcement implementation, the countermeasure can include a loud sound, a bright light, or other non-lethal deterrent or incapacitating action. For civilian use, the counter measure can include an animal counter measure (e.g., a bear alert package that includes a loud sound emitting device and a bright light designed to repel or discourage an animal such as a bear from approaching). For military applications, the countermeasure system can include any of the above and also include a weapon system. The weapon system can include one or more guns, missile launchers or other weapons that can be controlled (manually or automatically) to shoot at an approaching intruder. The weapon system can be controlled from the display/user interface 416 or the remote system 418. An operator can be shown an image of the intruder and provided with a reticle and control method to aim the weapon (swivel and tilt) using the reticle and a method to control the firing of the weapon system at a target (e.g., an approaching intruder). The weapon system could be automatically controlled by the control unit to fire at an approaching intruder if the intruder comes within a certain distance of a protected vehicle or location.

The countermeasure system can be set to automatically activate under given conditions (e.g., the intruder comes within a certain distance of a protected vehicle or location.

Figure 5:
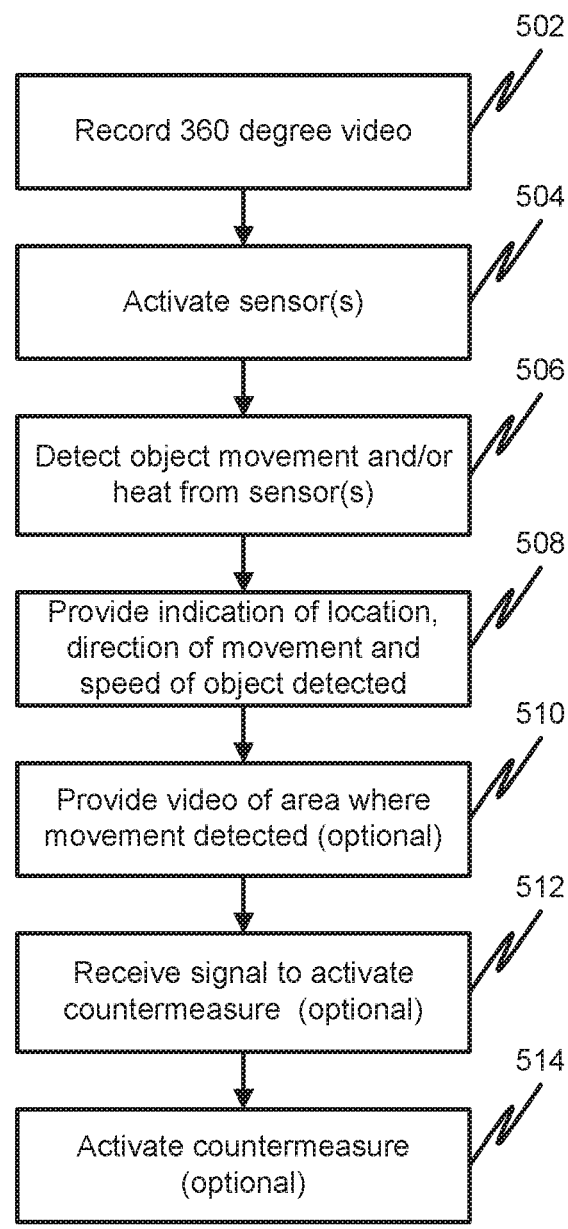
FIG. 5 is a flowchart of an example method of perimeter intrusion detection in accordance with some implementations.

FIG. 5 is a flowchart of an example method of perimeter intrusion detection in accordance with some implementations. The method starts at 502, where 360 degree video imagery is optionally recorded. The method continues to 504.

At 504, the sensor(s) for quadrants of a perimeter being monitored are activated. The method continues to 506.

At 506, object movement and/or heat signatures are detected by the activated sensors. The method continues to 508.

Figure 7:
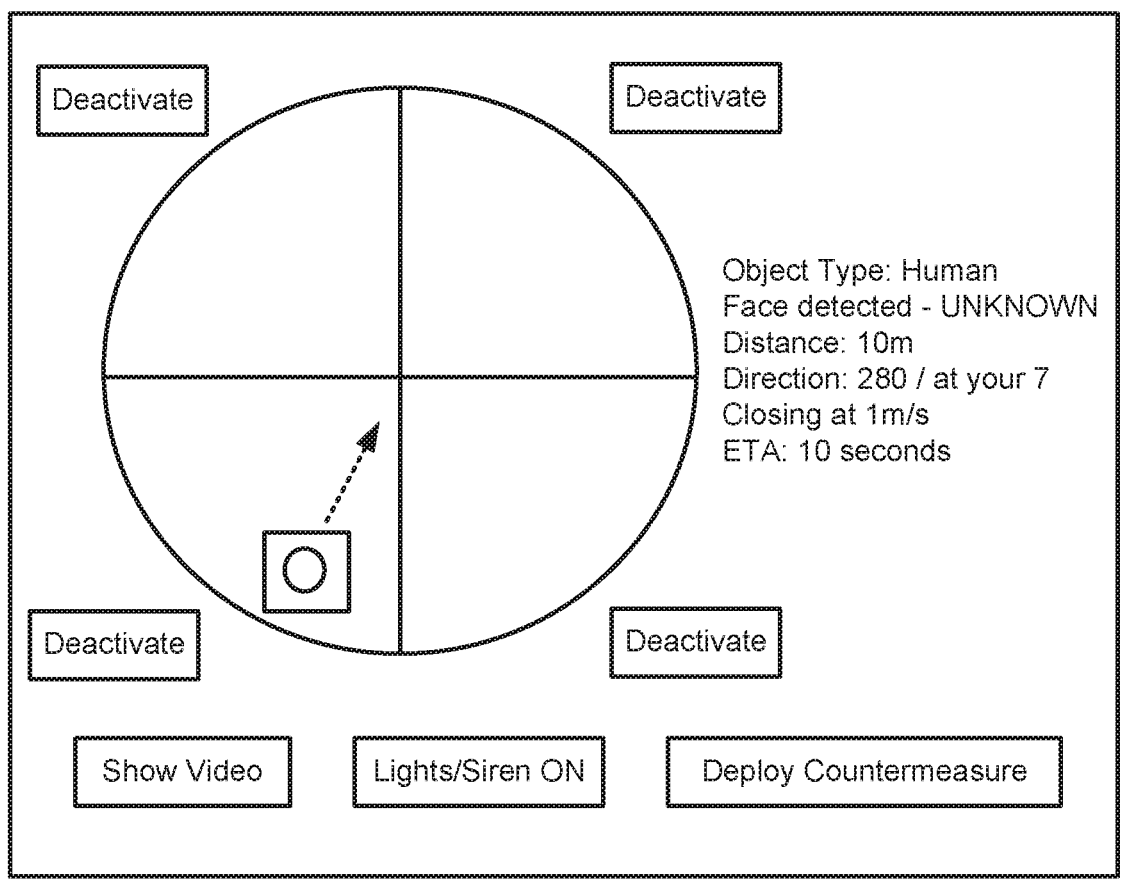
FIG. 7 is a diagram of an example user interface for a perimeter alert defense system in accordance with some implementations.

At 508, an indication of location, direction of movement and speed of object detected is provided. For example, this information can be displayed on a graphical user interface (e.g., as shown in FIG. 7) or provided as an audio alert inside a vehicle or in an earpiece or via a mobile device. the method continues to 510.

At 510, video of an area where an intrusion is detected is optionally provided to permit an operator to obtain a visual image of the intruding object. The method continues to 512.

At 512, a signal is received to activate a countermeasure. For example, a signal can be received from an operator or generated automatically, as described above. The method continues to 514.

At 514, the countermeasure is deployed. The countermeasure can include one or more of the countermeasures mentioned above.

Figure 6:
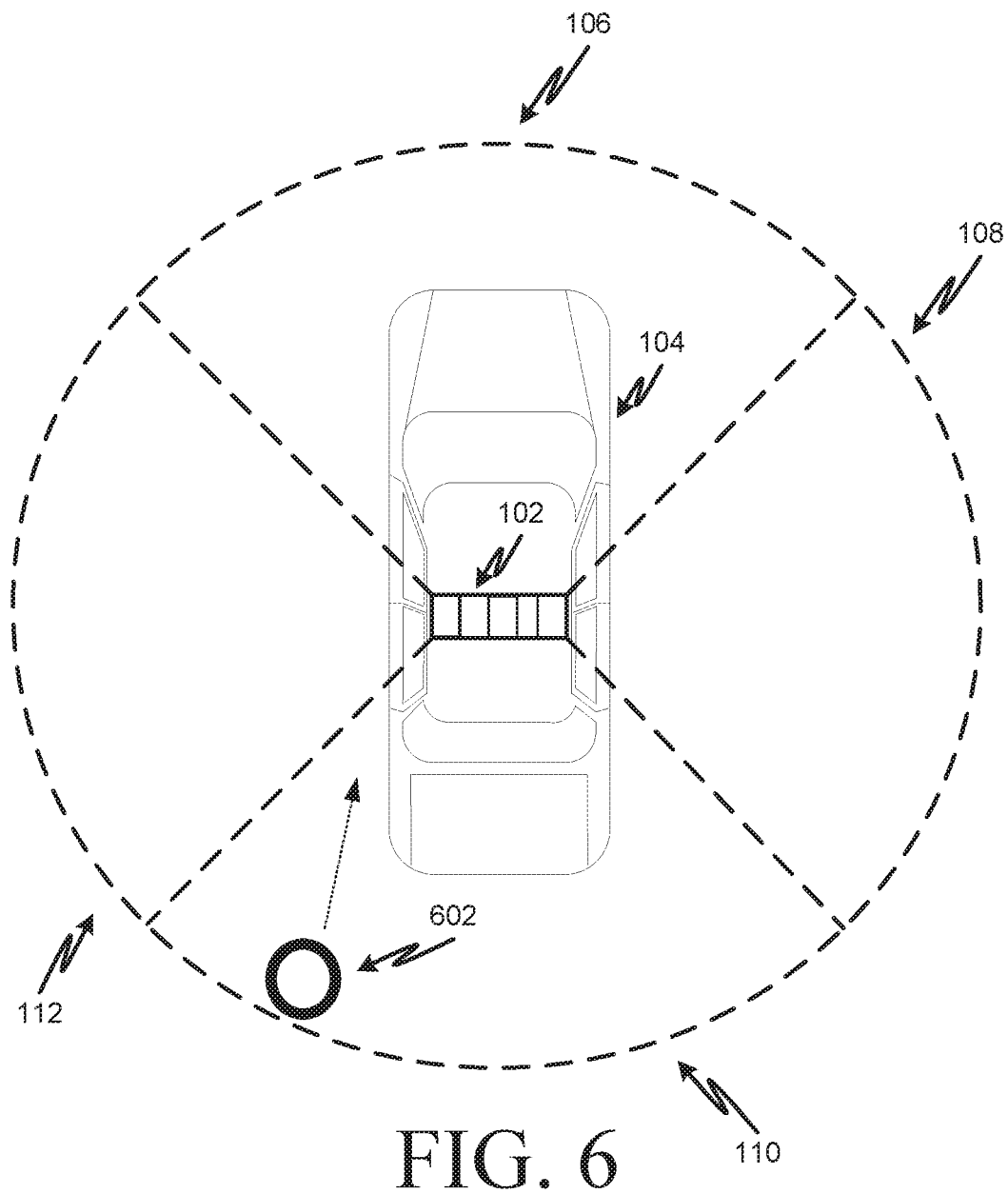
FIG. 6 is a diagram of an example perimeter alert defense system mounted on a vehicle showing example intrusion within one of the quadrants in accordance with some implementations.

FIG. 6 is a diagram of an example perimeter alert defense system mounted on a vehicle showing example intrusion 602 within one of the quadrants in accordance with some implementations. In this example, a law enforcement vehicle 104 has a perimeter intrusion 602 in quadrant 110.

FIG. 7 is a diagram of an example user interface for a perimeter alert defense system with a radar-style graphical display in accordance with some implementations. This example display shows what an operator might see for the scenario shown in FIG. 6. The intrusion is shown in the lower left quadrant. Details about the intrusion are shown to the right of the radar-style display. There are four buttons to deactivate the corresponding quadrants. There are also controls to show video (as shown in FIG. 8), turn on lights and/or siren, and deploy countermeasures.

Figure 8:
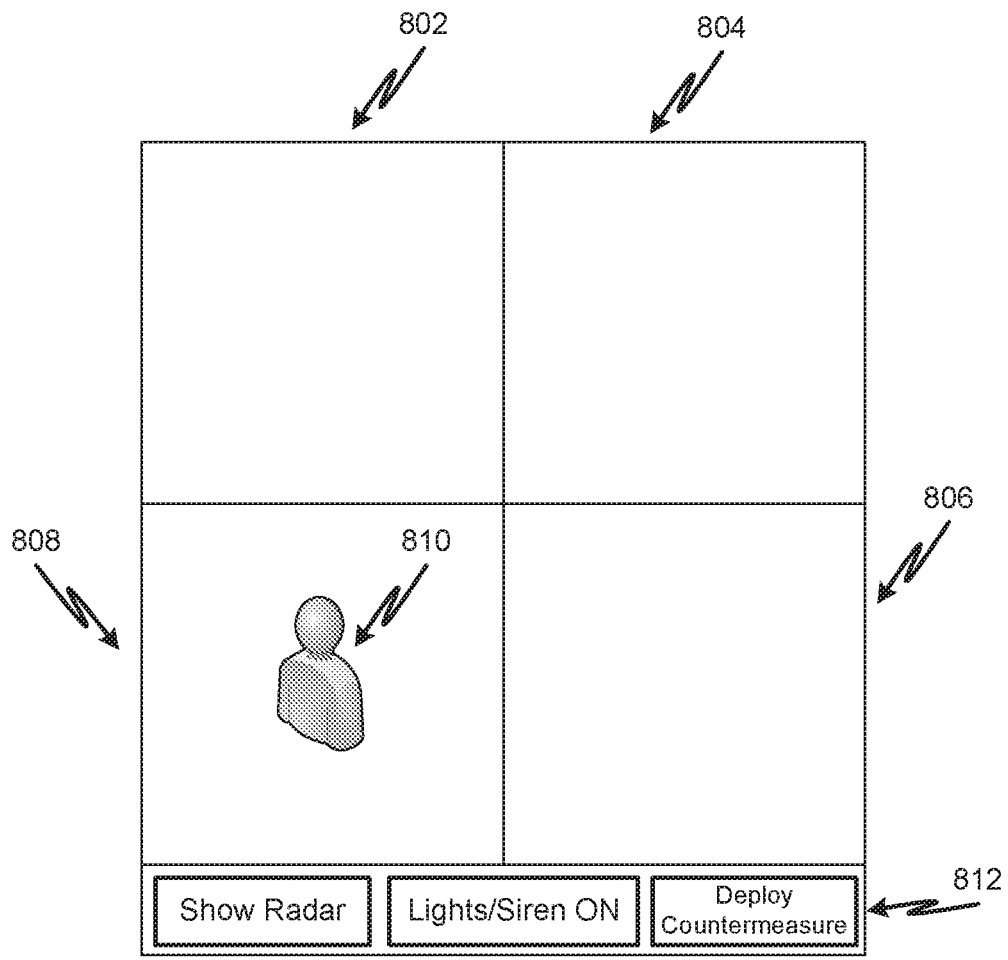
FIG. 8 is a diagram of an example user interface for a perimeter alert defense system in accordance with some implementations.

FIG. 8 is a diagram of an example user interface for a perimeter alert defense system in accordance with some implementations. FIG. 8 shows a video example corresponding to FIG. 6 and FIG. 7, where the intruder is a person 810 and is shown in the 808 quadrant (e.g., left rear). Controls 812 on the user interface can include a button to show the radar (e.g., FIG. 7), turn lights and siren on, and deploy countermeasures.

Figure 9:
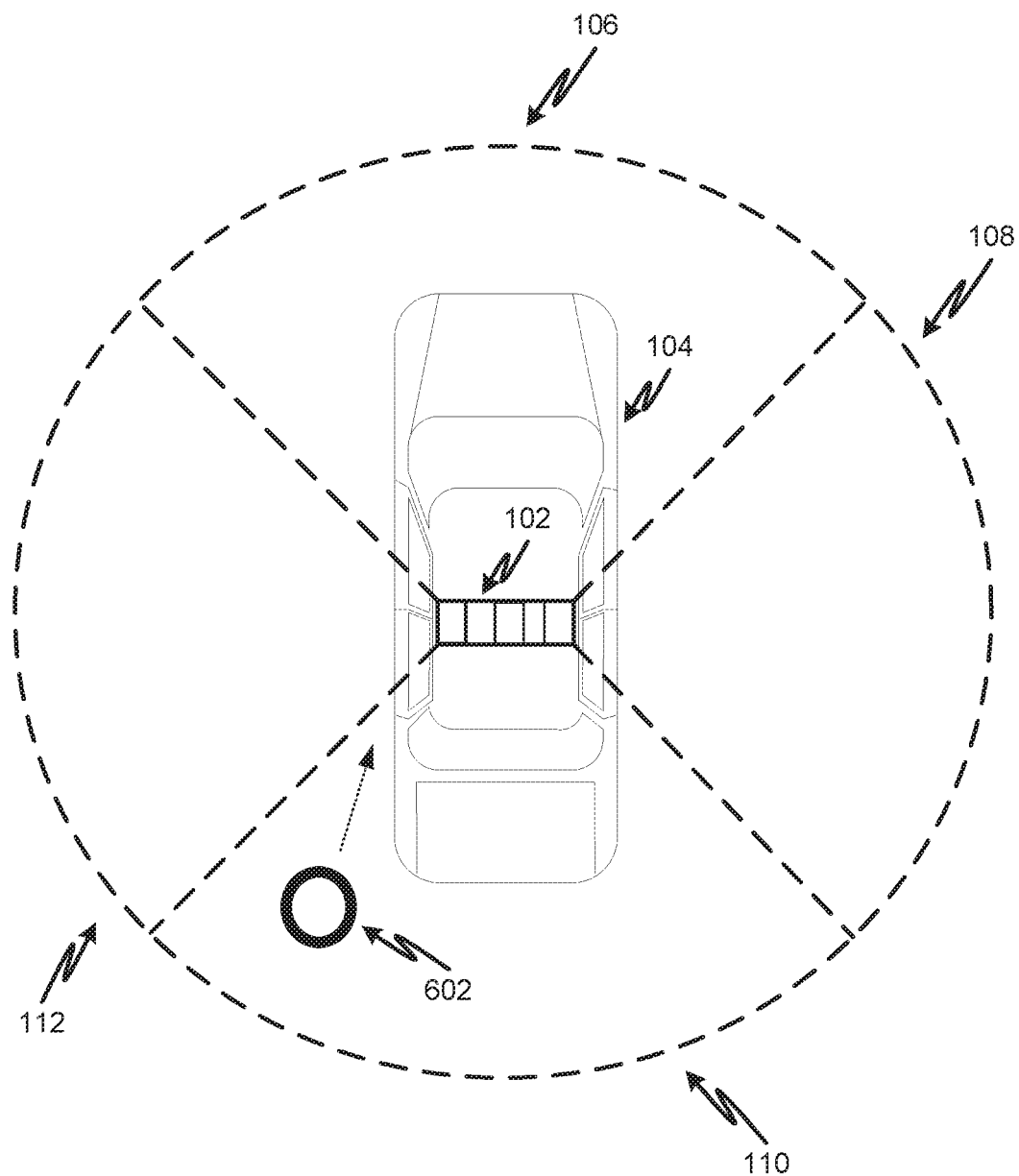
FIG. 9 is a diagram of an example perimeter alert defense system mounted on a vehicle showing example intrusion within one of the quadrants in accordance with some implementations.
Figure 10:
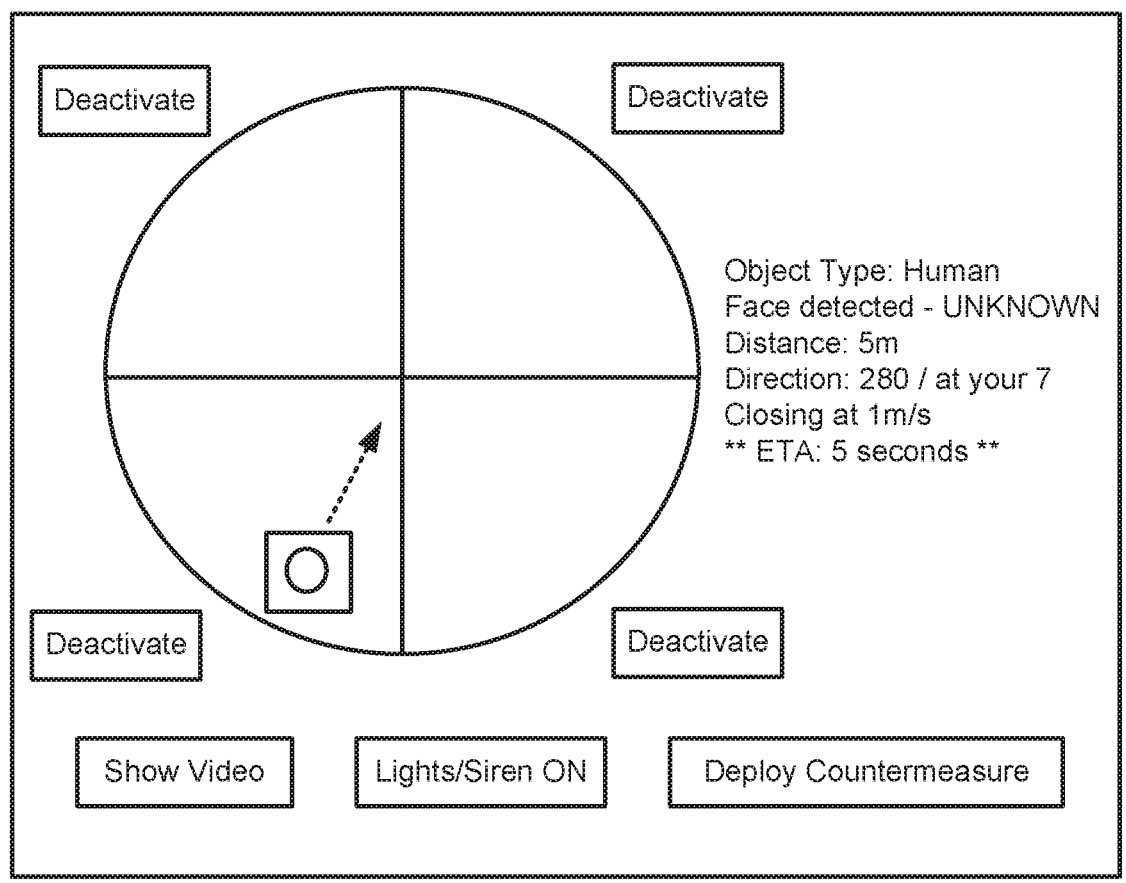
FIG. 10 is a diagram of an example user interface for a perimeter alert defense system in accordance with some implementations.

FIG. 9 is a diagram of an example perimeter alert defense system mounted on a vehicle showing example intrusion 602 moving closer to the vehicle 104. FIG. 10 is a diagram of an example user interface for a perimeter alert defense system showing the scenario of FIG. 9. As shown in FIG. 10, the intruder is now 5 m from the vehicle and closing at 1 m/s with an estimated arrival time of 5 seconds, which is visually highlighted for the operator. Audio alerting would also highlight the potential imminent threat of the intruder.

Figure 12:
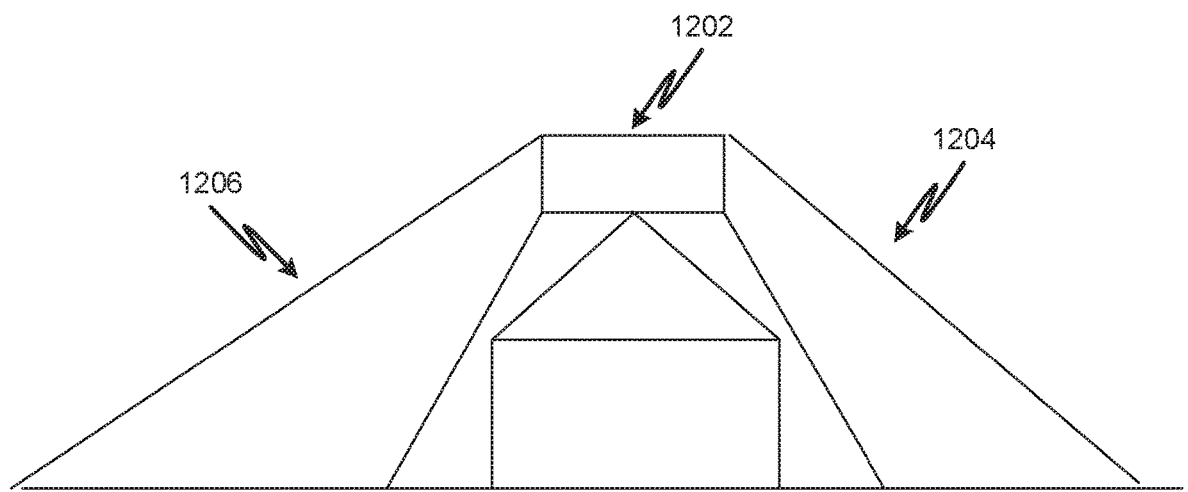
FIG. 12 is a diagram of an example portable perimeter alert defense system mounted at a location in accordance with some implementations.

FIG. 12 is a diagram of an example portable perimeter alert defense system mounted at a location in accordance with some implementations. In this embodiment, the perimeter alert defense system 1202 (e.g., similar to 400) could be mounted on a portable stand and used to protect a location (e.g., campsite, outpost, etc.) with a perimeter having quadrants (1204-1206) around the location.

Figure 13:
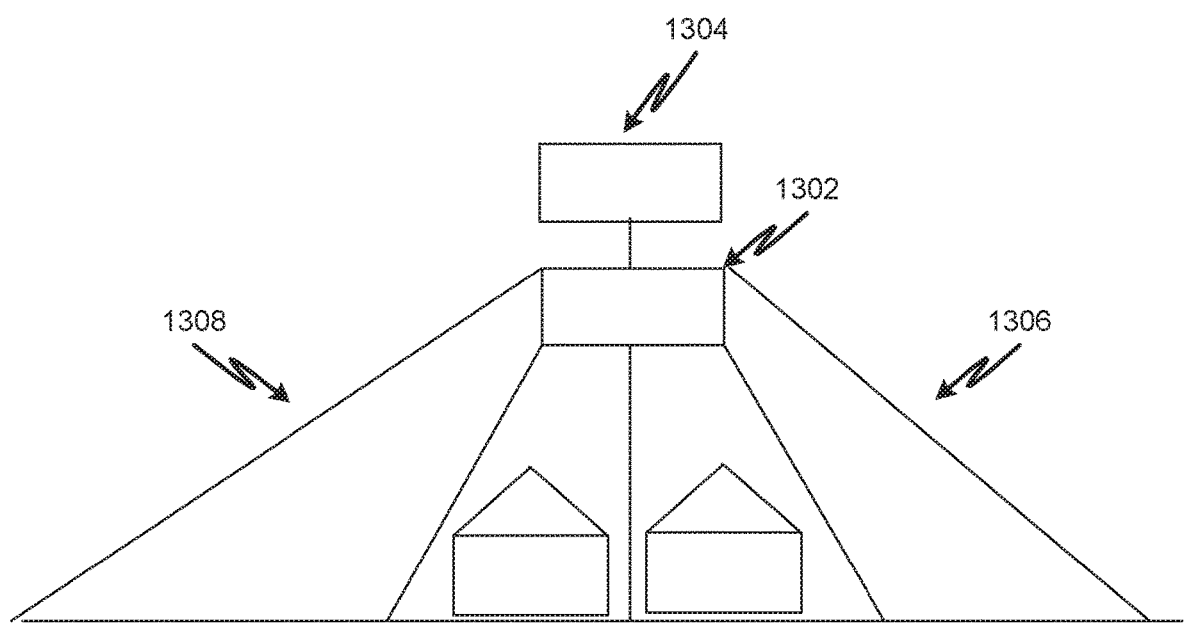
FIG. 13 is a diagram of an example portable perimeter alert defense system mounted at a location and having a countermeasure system in accordance with some implementations.

FIG. 13 is a diagram of an example portable perimeter alert defense system mounted at a location and having a countermeasure system in accordance with some implementations. In this embodiment, the perimeter alert defense system 1302 (e.g., similar to 400) could be mounted on a portable stand and used to protect a location (e.g., campsite, outpost, etc.) with a countermeasure system 1304 covering a perimeter having quadrants (1306-1308) around the location.

Figure 14:
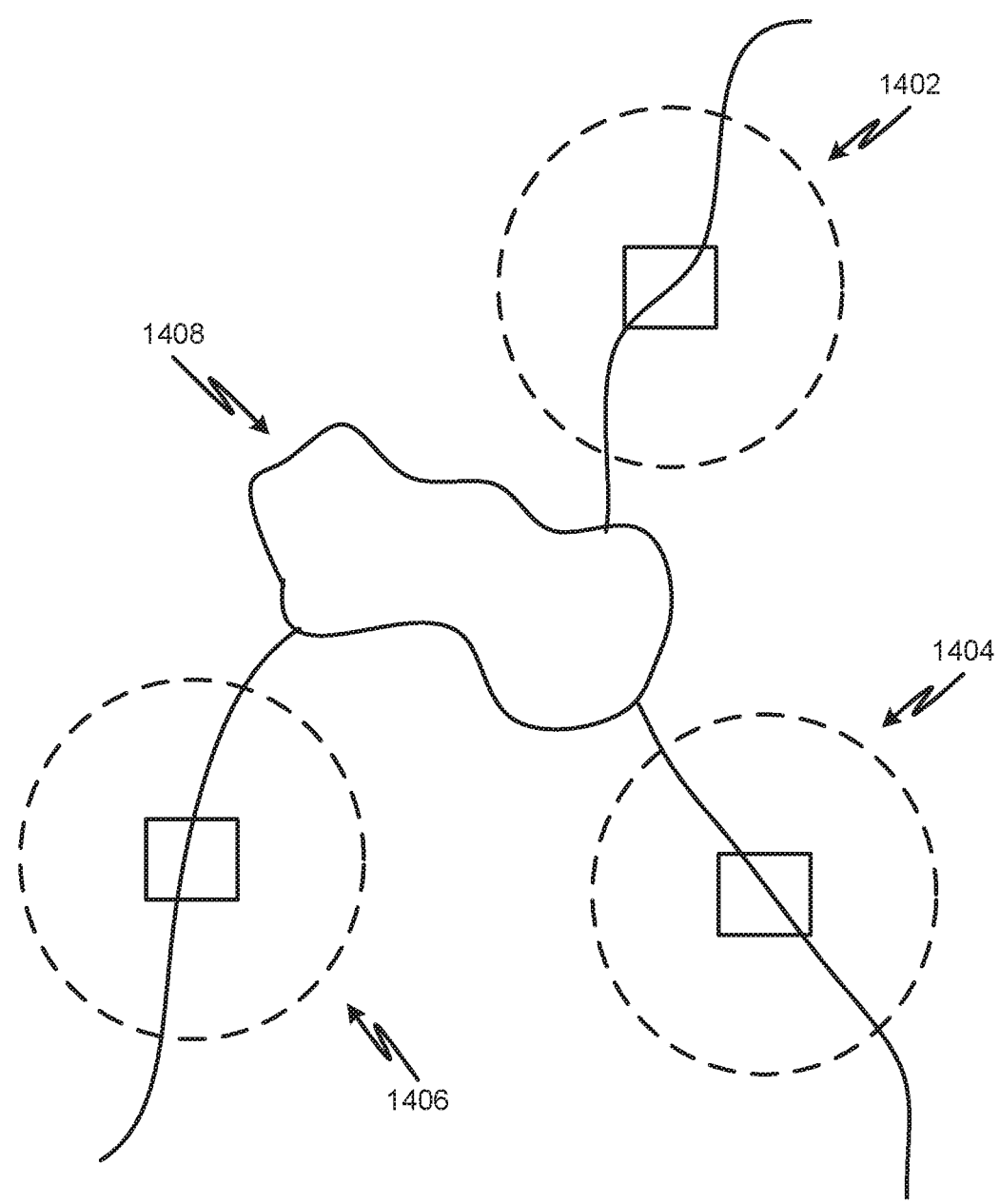
FIG. 14 is a diagram of an example arrangement of perimeter alert defense systems covering certain features surrounding an area in accordance with some implementations.

FIG. 14 is a diagram of an example arrangement of perimeter alert defense systems covering certain features surrounding an area in accordance with some implementations. One or more perimeter alert defense systems (1402-1406 could be set up at certain location (e.g., at points such as roads, trails, passes etc.) in order to detect movement to or from a given area 1408. This could be used to protect troops in the area 1408, detects movement into the area 1408 (e.g., by enemies or others) in order to provide a signal for troops to surround the area, or for search and rescue operations where a person is suspected to be lost in a given area (e.g., 1408) and the systems (1402-1408) could detect the person moving into the perimeter of a respective system and alert emergency personnel to the lost persons location via remote systems. The units could send an alert signal via cellular or other type of radio for remote areas.

In addition to detecting movement approaching a vehicle, the system could be used to search for people, animals or other objects by driving a vehicle with the system to a location and activating the sensors to detect heat for example. Then, moving the vehicle to a next location to look for heat or movement in that location and thus an operator could search an area using the vehicle mounted system as the sensors for search and rescue operation, for example.

In any of the embodiments described above, the communications channel from the control unit to other devices can include one or more of a hardwired communication link (e.g., cable, wire, etc.), a radio frequency communications link (e.g., microwave, other radio frequency (such as HF, UHF, VHF, LF, VLF), cellular, BlueTooth, WiFi, global satellite phone, etc.), and a light communications channel (e.g., laser, infrared, etc.). In general, any communications link that is capable of transmitting data and is suitable for the intended application can be used.

It is, therefore, apparent that there is provided, in accordance with the various embodiments disclosed herein, perimeter alert defense systems and methods.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A perimeter alert defense system configured to be mounted on a vehicle or mounted on a portable stand, the system comprising:
a control unit;
one or more sensors connected to the control unit; and
an imaging device connected to the control unit,
wherein the control unit is configured to receive input signals from the one or more sensors and determine whether an intrusion has occurred within a given perimeter of the perimeter alert defense system,
wherein the control unit is configured to record video of the perimeter using the imaging device, and wherein the control unit is configured to provide an alert when an intrusion within the perimeter meets certain threshold parameters, and
wherein the control unit is programmable to change the perimeter by changing a field of the perimeter, and wherein the field of the perimeter is characterized by one or more of a distance or a height monitored as part of the perimeter, and wherein the field of the perimeter corresponds to a boundary that includes and surrounds the vehicle on all sides of the vehicle.

2. The system of claim 1, wherein a solar power system is used to power the perimeter alert defense system.

3. The system of claim 1, wherein the one or more sensors detect one or more of: motion, heat, or presence of one or more of: an animate object or an inanimate object.

4. The system of claim 1, wherein the one or more sensors comprise one or more of: motion detection sensors, heat detection sensors, active infrared sensors, passive infrared sensors, microwave motion detection sensors, imaging device sensors, radar sensors, lidar sensors, sonar sensors, or thermal imaging sensors.

5. The system of claim 1, wherein the recorded video comprises one or more of: visible imaging or infrared imaging.

6. The system of claim 1, wherein the control unit is configured to distinguish between animate objects and inanimate objects.

7. The system of claim 1, wherein the control unit is configured to perform one or more of: facial recognition or object recognition.

8. The system of claim 1, wherein the alert is one or more of an audio alert or a video alert.

9. The system of claim 1, wherein the alert provides one or more of: a location, a direction of movement, or a speed of an object causing the intrusion.

10. The system of claim 9, wherein the direction of movement of the object is indicated by an audible direction of an audio component of the alert and the location of the object is indicated by one or more of a volume or a tone of the audio component of the alert.

11. A perimeter alert defense system configured to be mounted on a vehicle or mounted on a portable stand, the system comprising:

a control unit;

a counter-measure system;

one or more sensors connected to the control unit; and an imaging device connected to the control unit, wherein the control unit is configured to receive input signals from the one or more sensors and determine whether an intrusion has occurred within a given perimeter of the perimeter alert defense system, wherein the control unit is configured to record video of the perimeter using the imaging device, and wherein the control unit is configured to provide an alert when an intrusion within the perimeter meets certain threshold parameters, and wherein the counter-measure system takes one or more of: a non-lethal deterrent action or an incapacitating action, including at least one or more of a loud sound or a bright light.

12. The system of claim 11, wherein the counter-measure system is configured to activate automatically when predetermined conditions are met.

13. The system of claim 11, wherein the counter-measure system is operable by an operator, and wherein the counter-measure system provides the operator a reticle and control mechanism to one or more of monitor an object causing the intrusion through a user interface or target the object using one or more of the non-lethal deterrent action or the incapacitating action.

14. The system of claim 11, wherein the control unit is programmable to change the perimeter by changing a field of the perimeter, wherein the field of the perimeter is characterized by one or more of a distance or a height monitored as part of the perimeter.

15. The system of claim 11, wherein a solar power system is used to power the perimeter alert defense system.

16. A perimeter alert defense system configured to be mounted on a vehicle or mounted on a portable stand, the system comprising:

a control unit;

one or more sensors connected to the control unit; and an imaging device connected to the control unit, wherein the control unit is configured to receive input signals from the one or more sensors and determine whether an intrusion has occurred within a given perimeter of the perimeter alert defense system, wherein the control unit is configured to record video of the perimeter using the imaging device, and wherein the control unit is configured to provide an alert when an intrusion within the perimeter meets certain threshold parameters, and wherein the control unit is configured to output one or more of: a location, a direction of movement, or a speed of an object causing the intrusion.

17. The system of claim 16, wherein the direction of movement of the object is indicated by an audible direction of an audio component of the alert and the location of the object is indicated by one or more of a volume or a tone of the audio component of the alert.

18. The system of claim 16, wherein the control unit is programmable to change the perimeter by changing a field of the perimeter, wherein the field of the perimeter is characterized by one or more of a distance or a height monitored as part of the perimeter.

19. The system of claim 16, wherein a solar power system is used to power the perimeter alert defense system.

20. The system of claim 16, wherein the control unit is configured to distinguish between animate objects and inanimate objects.

* * * * *